United States Patent [19]

Ochiai

[11] Patent Number: 4,622,261
[45] Date of Patent: Nov. 11, 1986

[54] LASER RECORDING MATERIAL
[75] Inventor: Takeji Ochiai, Shizuoka, Japan
[73] Assignee: Fuji Photo Film Co., Ltd., Kanagawa, Japan
[21] Appl. No.: 723,980
[22] Filed: Apr. 16, 1985
[30] Foreign Application Priority Data Apr. 16, 1984 [JP] Japan .................. 59-76162

[51] Int. Cl.$^4$ ............... B32B 3/10; B32B 17/10; B32B 27/06
[52] U.S. Cl. .................. 428/195; 346/76 L; 346/137; 428/335; 428/336; 428/412; 428/429; 428/447; 428/448; 428/458; 428/913; 430/945
[58] Field of Search ............ 428/447, 333, 913, 448, 428/335, 458, 429, 412, 336, 195; 430/945

[56] References Cited
U.S. PATENT DOCUMENTS

| | | | |
|---|---|---|---|
| 4,317,123 | 2/1982 | Namiki et al. | 428/333 X |
| 4,389,441 | 6/1983 | Datta et al. | 428/447 X |
| 4,499,151 | 2/1985 | Dowbenko et al. | 428/447 |

FOREIGN PATENT DOCUMENTS 2021798 12/1979 United Kingdom ............... 430/945

Primary Examiner—Thomas J. Herbert
Attorney, Agent, or Firm—Sughrue, Mion, Zinn, Macpeak & Seas

[57] ABSTRACT

A laser recording material comprising a base, a polysiloxane coating film provided on at least one side of the base, said coating film being produced from a monomer represented by the formula:

$$R_xSi(OR')_{4-x}$$

wherein all the symbols are defined in the specification. The material has reduced surface defects and improved focus-servocontrol, is free from formation of a precipitate, appearance of white turbidity or deformation, and does not undergo reduction of sensitivity or reflectance.

19 Claims, 7 Drawing Figures

LASER RECORDING MATERIAL

FIELD OF THE INVENTION

This invention relates to a recording material for optically recording and/or reproducing information using laser beams.

BACKGROUND OF THE INVENTION

Recording media using beams having a high energy density, such as a laser beam, have hitherto been used. In these heat recording media, a recording layer having a high optical density absorbs irradiated beams of high energy density to cause a local rise of temperatue. This temperature change induces a physical or chemical change, which alters the optical characteristics of the irradiated area to record information.

Such recording media have the advantage that high density recording is possible; that recording and reading of information can be effected at a high speed; that access time is short; and that the recorded information has excellent preservability for an extended period of time.

Recording on these recording media is generally carried out by transforming the information to be recorded into electric time succession signals and scanning the recording medium with a laser beam having its intensity modulated according to the signals. This recording procedure has the advantage that a recorded image can be obtained in real time.

Conventional techniques for producing the above described laser recording materials include processes using an organic polymer, e.g., polymethyl methacrylate, polyvinyl butyral, etc., as an undercoat of the base and a process using an organosilicone resin as an undercoat as disclosed in Japanese Patent Application (OPI) No. 164454/82 (the term "OPI" as used herein refers to a "published unexamined Japanese patent application"). However, these techniques have still disadvantages including insufficient reduction of surface defects due to deficiency of the base surface, insufficient improvement of focus servocontrol due to unevenness of the base surface; insufficient prevention of the formation of precipitates ascribed to released metal ions on the base when using glass as a base, which result in the prevention of appearance of white turbidity of the base surface or precipitates in the recording layer; and insufficient prevention of deformation of the base; reduction of sensitivity or reduction of reflectance which is caused by moisture in air entering through the base in the case of air sandwiched type recording media using a plastic sheet as a base.

SUMMARY OF THE INVENTION

Accordingly, an object of this invention is to provide a laser recording material which has reduced defects due to minute scratches or adhesion of different substances to the surface of the base and which overcomes poor focus servocontrol due to unevenness of the base surface or deformation of the base.

Another object of this invention is to provide a laser recording material using a glass plate as a base, which does not form a precipitate on the base surface or in the recording layer.

A further object of this invention is to provide a laser recording material using a plastic sheet as a base, which is free from reduction of sensitivity or reduction of reflectance.

These and other objects of this invention have now been attained by a laser recording material comprising a base, a polysiloxane coating film provided on the base produced from monomers of the following general formula (I) $R_xSi(OR')_{4-x}$ wherein R and R' each represents an alkyl group having from 1 to 3 carbon atoms or a phenyl group, and x represents 0 or an integer of from 1 to 3, and a recording layer capable of recording and reproducing information using laser beams.

In addition, this invention relates to a laser recording disk containing this laser recording material, which may best be understood by reference to the following description taken in connection with the accompanying drawings, although it is understood that changes may be made in the form, size, proportions and minor details of construction without departing from the spirit or sacrificing any of the advantages of this invention.

BRIEF DESCRIPTION OF THE DRAWINGS

FIG. 2 is a cross-sectional view of an air-sandwiched laser recording disk.

FIG. 3 is a cross-sectional view of an air-sandwiched laser recording disk.

FIG. 4 is a cross-sectional view of an air-sandwiched laser recording disk.

FIG. 5 is a cross-sectional view of a solid-structure laser recording disk.

FIG. 6 is a cross-sectional view of a solid-structure laser recording disk.

FIG. 7 is a cross-sectional view of a solid-structure laser recording disk.

DETAILED DESCRIPTION OF THE INVENTION

Figure 1:
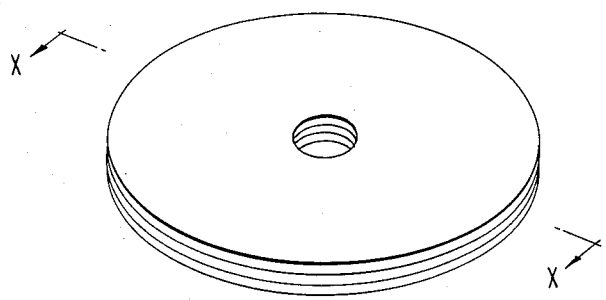
FIG. 1 is a schematic perspective view of a laser recording disk according to this invention.
Figure 2:
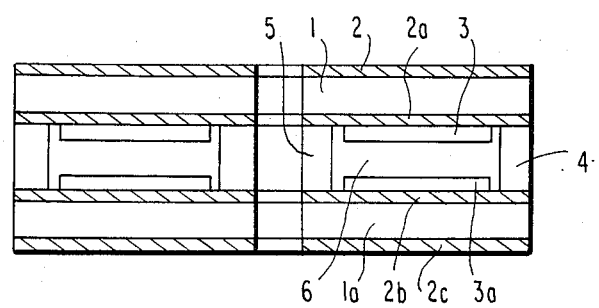
FIGS. 2 to 7 each is a cross sectional view of the disk shown in FIG. 1 along the X—X line, illustrating a structural example of laser recording disks according to this invention.
Figure 3:
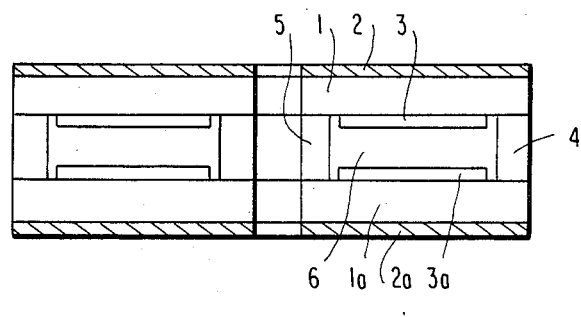
Figure 4:
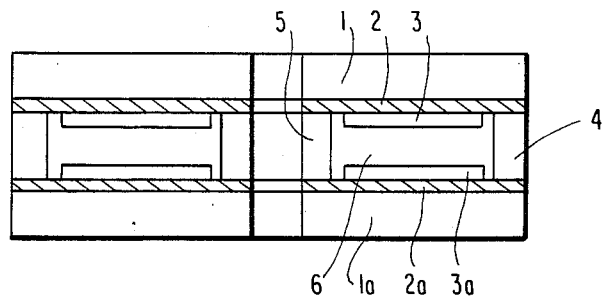

The laser recording materials according to this invention have an appearance as shown, e.g., in FIG. 1 and structural varieties as shown in FIGS. 2 to 7. Each of FIGS. 2 to 4 illustrates an embodiment of air-sandwiched structures.

In FIG. 2, each of two disk bases 1 and 1a is coated on both sides with a coating film of polysiloxane 2, 2a, 2b and 2c, and the polysiloxane coating film on the inner surface of each base has provided thereon recording layers 3 and 3a. The two bases 1 and 1a are attached together by an outer ring spaer 4 and an inner ring spacer 5 interposed therebetween. The combination of a pair of bases 1 and 1a, outer spacer 4 and inner spacer 5 forms a sealed space 6 in an "air-sandwiched" structure.

Other embodiments of laser recording materials having an air-sandwiched structure according to this invention are illustrated by FIGS. 3 and 4. In FIG. 3 each coating film of polysiloxane 2 and 2a is provided on only the outer surface of each base 1 and 1a. In FIG. 4 each polysiloxane coating film 2 and 2a is provided on only the inner surface of each base 1, 1a.

Figure 5:
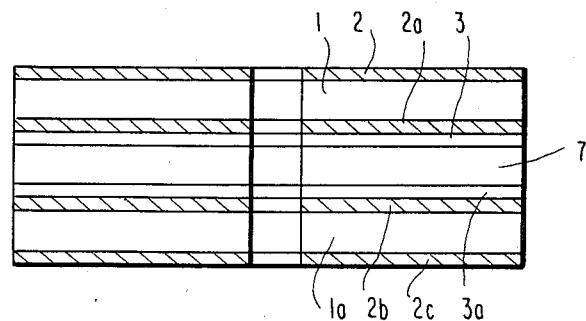
Figure 6:
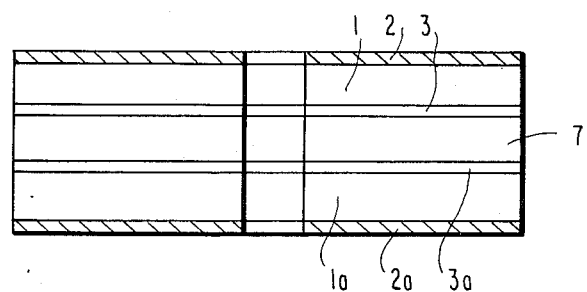
Figure 7:
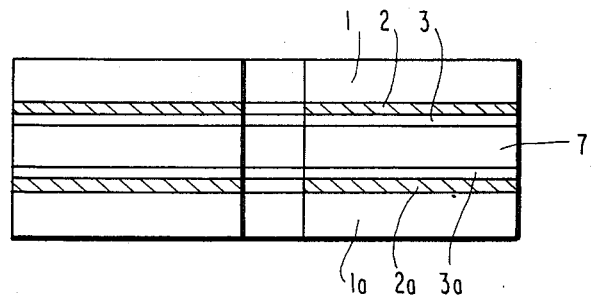

FIGS. 5 and 6 illustrate embodiments of this invention in which two disk bases are attached together by another disk 7 instead of the spacers shown in FIGS. 2 through 4, to form a solid structure. In FIG. 5, each polysiloxane coating film 2, 2a, 2b and 2c is formed on both the outer surface and the inner surface of each disk base 1 and 1a, and each recording layer 3 and 3a is formed on the polysiloxane coating film on the inner surface of each base 1, 1a. The two bases are attached together by another disk 7, which is interposed between the two bases and adhered to the inner surface of each recording layer 3. Disk 7 may be made of the same material as used for base 1. In the embodiment illustrated in FIG. 6, each polysiloxane coating film 2, 2a is provided on only the outer surface of each base 1, 1a . In FIG. 7 each polysiloxane coating film 2, 2a is formed on only the inner surface of each base 1, 1a.

The base material which can be used in this invention is not unduly limited and can include any conventional dimensionally stable, transparent material such as glass, plastics, e.g., cellcasted polymethyl methacrylate, injection-molded polymethyl methacrylate, polyvinyl chloride, vinyl chloride copolymer or polycarbonate.

The polysiloxane coating film can be formed by coating an organoalkoxysilane and/or organoaroxysilane represented by the following formula (I) on a base and condensing the coated layer by heat treatment:

$$R_xSi(OR')_{4-x} \qquad (I)$$

wherein R and R' each represents an alkyl group having from 1 to 3 carbon atoms or a phenyl group; and x represents 0 or an integer of from 1 to 3. When the mixture of the organoalkoxysilane and the organoaroxysilane is used, the ratio of alkoxysilane/aroxysilane is preferably 9/1 to 1/9 by mol.

Preferred examples of the compounds represented by the formula (I) include $Si(OCH_3)_4$, $(CH_3)_3SiOCH_3$, $(C_6H_5)_3SiOCH_3$, $Si(OC_2H_5)_4$, $(CH_3)_3SiOC_2H_5$, $(C_6H_5)_3SiOC_2H_5$, $Si(OC_3H_7)_4$, $(C_2H_5)_3SiOC_3H_7$, $C_6H_5Si(OC_3H_7)_3$, $Si(OC_6H_5)_4$, $(CH_3)_3SiOC_6H_5$, and $C_6H_5Si(OC_6H_5)_3$. Of these, $Si(OCH_3)_4$, $Si(OC_2H_5)_4$, $Si(OC_3H_7)_4$ and $Si(OC_6H_5)_4$ are particularly preferred.

The compound of formula (I) is dissolved in a solvent, and the resulting coating solution is applied on the base by a conventional coating method, such as spin coating, dip coating, extrusion coating, bar coating, screen printing, brush coating, spraying, roller coating, etc. The solvent which can be used for dissolving the compound of the formula (I) includes methanol, ethanol, propanol, butanol, acetone, methyl ethyl ketone, methyl isobutyl ketone, methyl acetate, ethyl acetate, isopropyl acetate, butyl acetate, methyl cellosolve, ethyl cellosolve, butyl cellosolve, methyl cellosolve acetate, ethyl cellosolve acetate, butyl cellosolve acetate, and the like.

The organoalkoxysilane and/or organoaroxysilane are usually coated to a dry thickness after the subsequent condensation of from about 200° Å to 50 μm, depending on the particular qualities desired and the particular emdiment. For example, the dry coating thickness is preferably from about 0.5 μm to 10 μm for the purpose of reducing the rate of surface defects; from about 5 to 50 μm for the purpose of flattening the base surface; from about 0.1 to 10 μm for the purpose of preventing precipitation; or from about 0.2 to 10 μm for the purpose of protecting a plastic base from moisture. A generally suitable thickness of the coating film is preferably from about 0.1 to 50 μm, and more preferably from about 0.5 to 10 μm.

After the compound of formula (I) is coated onto the surface of a base to form a coating layer, the coating layer is subjected to heat treatment to form a polysiloxane coating film.

The heat treatment for condensation is usually carried out at a temperature ranging from about 100° C. to 500° C., but at a temperature such that heating does not deform or soften the base. When glass is used as a base, the heat treatment is preferably effected at a temperature of from about 400° C. to 480° C. for about 30 minutes.

In order to prevent the base from melting or deforming during the heat treatment, a method for heating only the coating layer can be employed. According to such the method, the heat treatment is carried out using a surface heating means selected from flame, plasma discharge, glow discharge, laser beams, electron beams and microwaves. When this surface heating method is applied to this invention, the heating is suitably performed at a surface temperature of from about 400° C. to 3,000° C. for a period of from about 1 to 5 seconds. Such the heat treatment is preferably applied to a plastic base.

The coating film of compound (I) may be formed on either one or both sides of the base. For the purpose of decreasing surface defects due to minute scratches or adhesion of different substances e.g., a dust on the surface of the base, or to prevent white turbidity ascribed to formation of a precipitate in the case of using glass as a base, the desired effect can be attained by forming the coating film on either side of the base. For the purpose of preventing precipitation in the recording layer in the case of using glass as a base, the coating film should be provided at least on the side on which a recording layer is to be formed. Further, for the purpose of preventing deformation due to moisture absorption in the case of using plastic as a base, the coating film should be provided at least on the side opposite to the side on which a recording layer is to be provided. For the purpose of preventing reduction of sensitivity or reduction of reflectance, the coating film may be formed on either side.

An intermediate layer optionally may be provided between the base and the recording layer or between the polysiloxane layer coated on the base and the recording layer for heat insulation to ensure sensitivity.

Materials which can be used as the intermediate layer include, for example, polymers, such as polymethyl methacrylate, acrylic acid/methacrylicacid copolymers, styrene/maleic anhydride copolymers, polyvinyl alcohol, N-methylolacrylamide, styrene/sulfonic acid copolymers, styrene/vinyltoluene copolymers, polyhydroxystyrene, chlorinated polyethylene, chlorosulfonated polyethylene, nitrocellulose, polyvinyl chloride, vinyl chloride copolymers, polyesters, polyimides, vinyl acetate/vinyl chloride copolymers, ethylene/vinyl acetate copolymers, polyethylene, polypropylene or polycarbonate.

The dry thickness of the intermediate layer is usually from about 0.01 to 20 μm, and preferably from about 0.1 to 10 μm. The intermediate layer can be formed by dissolving or dispersing the above recited polymer in an appropriate solvent, and applying the solution or dispersion either onto the base or the polysiloxane coating film on which a recording layer is to be formed by a conventional coating method, such as spin coating, dip coating, extrusion coating, bar coating, screen printing, etc.

An anti-reflection layer can be provided to the recording layer on the opposite side where laser beam is to be applied, if desired. Suitable antireflection layers are described, e.g., in U.S. Pat. Nos. 4,000,492, 4,335,198 and 3,560,994, and specifically include metals, such as aluminum, chromium, indium, copper, germanium, etc., oxides, sulfides or halides of these metals, and dyes.

Materials which can be used for the recording layer according to this invention are conventional recording materials described, e.g., in U.S. Pat. Nos. 4,188,214, 4,291,119, 4,415,650, 4,271,256, 4,388,400 and 4,237,468. Specific examples include metals, such as tellurium, zinc, indium, tin, zirconium, aluminum, copper or germanium; semimetals, such as bismuth, arsenic or antimony; semiconductors, such as silicon; and alloys or combinations thereof. Compounds of these metals or semimetals, such as sulfides, oxides, borates, silicates, carbides, nitrides and the like or mixtures of these metal or semimetal compounds with metals may also be employed for the recording layer.

The recording layer can be formed by applying the above described material by sputtering, ion plating or other conventional method to a thickness of from about 100 Å to 5,500 Å on a dry basis.

This invention will now be illustrated in greater detail with reference to the following examples of specific embodiments thereof, but it should be understood that these examples are not to be construed as limiting the scope of this invention. Unless otherwise indicated, all parts, percents and ratios are by weight.

EXAMPLE 1

0.8 g of tetramethoxysilane was dissolved in 20 ml of a mixed solvent of ethanol and ethyl acetate (1:1 by volume), and the solution was coated on one surface of a disk of soda-lime glass having a thickness of 1.3 mm and a diameter of 305 mm to a dry film thickness of 5,000 ° Å and subjected to heat treatment at 450° C. for 30 minutes to form a polysiloxane coating layer on the disk. Indium and germanous sulfide were simultaneously applied to the polysiloxane-coated side of the disk by vacuum evaporation coating in amounts corresponding to a thickness of 250 Å and 200 Å respectively, with the periphery and the central part of the surface of the tetramethoxysilane-coated side of the disk being shielded, to thereby form a recording layer. A pair of bases each having such a polysiloxane layer and a recording layer on one surface thereof were attached together in such a manner that the two recording layers faced to each other, by means of an outer ring spacer and an inner ring spacer being interposed therebetween and affixed to the two base surfaces with an ultraviolet hardening adhesive to produce a laser recording material of the air-sandwiched type as shown in FIG. 4.

EXAMPLE 2

A laser recording material of the air-sandwiched type was prepared in the same manner as in Example 1 except for using tetraethoxysilane in place of tetramethoxysilane.

EXAMPLE 3

A laser recording material of air-sandwiched type was prepared in the same manner as in Example 1 except for using tetraphenoxysilane in place of tetramethoxysilane.

EXAMPLE 4

The same procedures as described in Example 2 were repeated except that tetraethoxysilane was coated on both surfaces of each base. A laser recording material as shown in FIG. 2 was produced comprising a pair of bases each having a polysiloxane coating film on both the inner side on which a recording layer was formed and the outer side.

COMPARATIVE EXAMPLE 1

A laser recording material of air-sandwiched type was obtained in the same manner as in Example 1 except for using an organosilicone resin described in Japanese Patent Application (OPI) No. 164454/82 (methyl group : phenyl group : ethoxy group : hydroxyl group=12:6:2:1, average molecular weight: ca. 1,500) in place of tetramethoxysilane as used in Example 1.

COMPARATIVE EXAMPLE 2

A laser recording material of air-sandwiched type was obtained in the same manner as in Example 1 except that the tetramethoxysilane coating was omitted.

EXAMPLE 5

The same procedures as described in Example 1 were repeated except that a cellcasted polymethyl methacrylate plate having a thickness of 1.5 mm was used in place of the soda-lime glass and that the tetramethoxysilane coating layer was subjected to surface heat treatment as follows instead of the heat treatment of 450° C. for 30 minutes as used in Example 1.

The surface heat treatment was carried out by using a flame of a mixed gas of propane gas and oxygen (2:5 by volume) combusted by a burner with a distance of 20 mm between the burner and the surface of the base under the following conditions:
Surface temperature of coating layer: about 2,500° C.
Treating time: about 5 sec.

There was obtained an air-sandwiched laser recording material as shown in FIG. 4 comprising a pair of joined polymethyl methacrylate bases each having a polysiloxane coating film only on its inner surface on which a facing recording layer was formed.

EXAMPLE 6

The same procedures as in Example 5 were repeated except that tetramethoxysilane was coated only on the base surface opposite to the side on which the recording layer was to be formed, to thereby obtain an air-sandwiched laser recording material as shown in FIG. 3 comprising a pair of polymethyl methacrylate bases each having a recording layer on its inner surface and a polysiloxane coating film on its outer surface.

COMPARATIVE EXAMPLE 3

A laser recording material of air-sandwiched type was prepared in the same manner as in Example 5 except that coating of tetramethoxysilane and the subsequent heat treatment were omitted.

Each of the resulting information recording media was measured to determine the number of defects, the number of precipitates in the recording layer, the number of precipitates on the base surface opposite to the recording layer, and sensitivity of laser recording in accordance with the following measurement methods. The results obtained are shown in Table 1.

During the preparation of the above recording media, the surface roughness of bases was measured prior to the formation of the recording layer, and the results obtained are also shown in Table 1.

Method of Measurement

TABLE 1

| Example No. | Number of Defects (laser power) (/cm²) | | Surface Roughness (μm) | Number of Precipitates | | Power Intensity Required (mW) | | |
|---|---|---|---|---|---|---|---|---|
| | | | | Recording Layer | Base Surface | Immediately after Preparation | After 3 Days | After 7 Days |
| Example 1 | $7 \times 10^2$ | (a) | 0.02 | o | — | — | — | — |
| | $8 \times 10^2$ | (b) | | | | | | |
| Example 2 | $2 \times 10^2$ | (a) | 0.02 | o | — | — | — | — |
| | $3 \times 10^2$ | (b) | | | | | | |
| Example 3 | $4 \times 10^2$ | (a) | 0.02 | o | — | — | — | — |
| | $6 \times 10^2$ | (b) | | | | | | |
| Example 4 | $2 \times 10^2$ | (a) | 0.02 | o | o | — | — | — |
| | $3 \times 10^2$ | (b) | | | | | | |
| Comparative Example 1 | $1 \times 10^3$ | (a) | 1.0 | x | x | — | — | — |
| | $2 \times 10^3$ | (b) | | | | | | |
| Comparative Example 2 | $1 \times 10^3 \sim 3 \times 10^3$ | (a) | 1.0 | x | x | — | — | — |
| | $1 \times 10^3 \sim 2 \times 10^3$ | (b) | | | | | | |
| Example 5 | $2 \times 10^2$ | (a) | 0.5 | — | — | 6.2 | 6.2 | 6.5 |
| | $6 \times 10^2$ | (b) | | | | | | |
| Example 6 | — | | — | — | — | 6.2 | 6.2 | 6.5 |
| Comparative Example 3 | $4 \sim 5 \times 10^3$ | (a) | 5~6 | — | — | 6.2 | 7.0 | 8.0 |
| | $1 \sim 2 \times 10^3$ | (b) | | | | | | |

(1) Number of Defects:

While an information recording medium was rotated at 515 rpm, the area from the diameter of 109 mm to the diameter of 128 mm was scanned with laser beams which were condensed so as to have a diameter of about 1.6 μm at the surface of the recording layer to measure the reflected light. Defects on the base surface caused by scratches or adhesion of different substances were detected as a change of reflection of the laser beams.

The apparatus for measuring the number of defects per unit of surface area had previously been calibrated with a standard sample on which a polystyrene colloid having a known grain size had been coated, and was designed so that the number of defects having a size of 0.3 to 1 μm or greater than 1 μm could be detected per cm² with a laser power level of (a) 0.09 V or (b) 0.33 V, respectively.

(2) Number of Precipitates in Recording Layer and on Base Surface Opposite to Recording Layer:

After an information recording medium was allowed to stand at 60° C. and 90% RH for 5 days, the number of precipitates having appeared in a circle of 2.5 mm in diameter was counted by means of an optical microscope at 100 magnifications. In Table 1, o indicates no formation of a precipitates, Δ indicates formation of from 1 to 5 precipitates; and x indicates formation of 6 or more precipitates.

(3) Sensitivity:

After an information recording medium was allowed to stand at 60° C. and 90% RH for 3 days or 7 days, recording was carried out on the recording medium while being rotated at 515 rpm by applying semiconductor laser beams (wavelength: 820 nm) which were condensed to a diameter of 1.3 μm at the surface of the recording layer by an autofocus objective lens onto a recording layer on the line of circumference of a diameter of 180 mm using pulses of 2.5 MHz, 200 nsec. The minimum laser power intensity which formed pits having a diameter of about 1 μm on the recording layer was measured. The greater the power intensity required, the lower the sensitivity of the medium.

(4) Surface Roughness:

The base surface was scanned with a roughness tester (Surfcon, made by Tokyo Seiki K.K.) over a length of 5 cm, and the roughness was expressed in terms of a difference between the lowest level and the highest level.

While the invention has been described in detail and with reference to specific embodiments thereof, it will be apparent to one skilled in the art that various changes and modifications can be made therein without departing from the spirit and scope thereof.

What is claimed is:

1. A laser recording material comprising a base, a recording layer capable of recording and reproducing information using laser beams provided on said base and a polysiloxane coating film provided (1) on a side of the base opposite the recording layer, (2) between the recording layer and the base or (3) on the side of the base opposite the recording layer and also between the recording layer and the base, said coating film being produced from a monomer represented by the formula:

$$R_xSi(OR')_{4-x}$$

wherein R and R¹ each represents an alkyl group having from 1 to 3 carbon atoms or a phenyl group; and x represent 0 or an integer of from 1 to 3.

2. A laser recording material as claimed in claim 1, wherein the recording layer has a thickness of from 100 to 5500 Å and comprises at least one of a metal, a semimetal, a semiconductor, an alloy or combination of said metal, semimetal or semiconductor, and a compound of said metal or semimetal.

3. A laser recording material as claimed in claim 2 wherein the recording layer comprises a mixture of at least one metal or semimetal compound with at least one metal.

4. A laser recording material as claimed in claim 2, wherein said metal is tellurium, zinc, indium, tin, zirconium, aluminum, copper or germanium; said semimetal is bismuth, arsenic or antimony; said semiconductor is silicon and said compound of said metal or semimetal is a sulfide, oxide borate, silicate, carbide or nitride.

5. A laser recording material as claimed in claim 1, wherein the polysiloxane coating film has a dry thickness of from about 0.1 to 50 μm.

6. A laser recording material as claimed in claim 1, wherein the base comprises glass and the polysiloxane coating film is provided between the base and the recording layer.

7. A laser recording material as claimed in claim 1, wherein the base comprises plastic and the polysiloxane coating film is provided on the surface of the base opposite to the recording layer.

8. A laser recording material as claimed in claim 1, wherein the polysiloxane coating film is formed by heat condensation of the monomer and said condensation is carried out at a temperature of from about 100° C. to 500° C.

9. A laser recording material as claimed in claim 1, wherein the condensation is carried out at a surface temperature of from about 400° C. to 3,000° C. for from about 1 to 5 seconds by means of flame, plasma discharge, glow discharge, laser beams, electron beams or microwaves.

10. A laser recording material as claimed in claim 1, wherein an anti-reflection layer is provided on the recording layer.

11. A laser recording material as claim in claim 1, wherein the monomer is an organoalkoxysiliane or organoaroxylsiliane selected from the group consisting of $Si(OCH_3)_4$, $(CH_3)_3SiOCH_3$, $(C_6H_5)SiOCH_3$, $Si(OC_2H_5)_4$, $(CH_3)_3SiOC_2H_5$, $(CH_6H_5)_3SiOC_2H_5)$, $Si(OCH_7)_4$, $(C_2H_5)_3SiOCH_7$, $C_6H_5Si(OC_3H_7)_3$, $Si(OC_6H_5)_4$, $(CH_3)_3SiOC_6H_5$ and $C_6H_5Si(OC_6H_5)_3$.

12. A laser recording material as claimed in claim 1, wherein the monomer is an organoalkoxysilane or organoaroxysilane selected from the group consisting of $Si(OCH_3)_4$, $Si(OC_2H_5)_4$, $Si(OC_3H_7)_4$ and $Si(OC_6H_5)_4$.

13. A laser recording material as claimed in claim 1, wherein the monomer is a mixture of an organoalkoxysilane and an organoaroxysilane in a mixing ratio of 9/1 to 1/9 by mol.

14. A laser recording material as claimed in claim 1, wherein the base is a glass or a plastic selected from the group consisting of cellcasted polymethyl methacrylate, injection-molded polymethyl methacrylate, polyvinyl chloride, vinyl chloride copolymer and polycarbonate.

15. A laser recording material as claimed in claim 1, wherein the polysiloxane coating film has a dry thickness of from about 200 Å to 50 μm.

16. A laser recording disk comprising a first disk-shaped base, having a polysiloxane coating film provided on at least one surfaces of said base, said coating film being produced from a monomer represented by the formula $R_xSi(OR')_{4-x}$, wherein R and R' each represents an alkyl group having from 1 to 3 carbons or a phenyl group, and x represents 0 or an integer of from 1 to 3, and a recording layer capable of recording and reproducing information using laser beams provided on said coating film on one surface of said disk;

a second disk-shaped base having a polysiloxane coating film provided on at least one surfaces of said base, said coating film being produced from a monomer represented by the formula $R_xSi(OR')_{4-x}$, wherein R and R' each represents an alkyl group having from 1 to 3 carbons or a phenyl group, and x represents 0 or an integer of from 1 to 3, and a recording layer capable of recording and reproducing information using laser beams provided on said coating film on one surface of said disk; and connecting means for connecting said first disk and said second disk in spaced, coaxial relationship such that the recording layers of said first disk and said second disk are contained in a central air cavity formed by said first disk, said second disk and said connecting means.

17. A laser recording disk comprising a first disk-shaped base, having a polysiloxane coating film provided on at least one surface of said base, said coating film being produced from a monomer represented by the formula $R_xSi(OR')_{4-x'}$ wherein R and $R^1$ each represents an alkyl group having from 1 to 3 carbons of a phenyl group, and x represents 0 or an integer of from 1 to 3, and a recording layer capable of recording and reproducing information using laser beams provided on said coating film on one surface of said disk;

a second disk-shaped base having a polysiloxane coating film provided on at least one surface of said base, said coating film being produced from a monomer represented by the formula $R_xSi(OR')_{4-x'}$, wherein R and $R^1$ each represents an alkyl group havin from 1 to 3 carbons or a phenyl group, and x represents 0 or an integer of from 1 to 3, and a recording layer capable of recording and reproducing information using laser beams provided on said coating film on one surface of said disk; and a third disk-shaped base interposed between said first and second disk-shaped bases in coaxial relationship therewith, each of the opposite surfaces of said third disk-shaped base being respectively attached to a surface of said first or second disk-shaped base on which said recording layer has been provided, whereby the recording layers of said first and second disk-shaped bases face each other.

18. A laser recording disk comprising a first disk-shaped base, having a polysiloxane coating film provided on one urface of said base, said coating film being produced from a monomer represented by the formula $R_xSi(OR')_{4-x'}$, wherein R and R' each represents an alkyl group having from 1 to 3 carbons or a phenyl group, and x represents 0 or an integer of from 1 to 3, and a recording layer capable of recording and reproducing information using laser beams provided on the other surface of said disk;

a second disk-shaped base having a polysiloxane coating film provided on one surface of said base, said coating film being produced from a monomer represented by the formula $R_xSi(OR')_{4-x'}$, wherein R and R' each represents an alkyl group having from 1 to 3 carbons or a phenyl group, and x represents 0 or an integer of from 1 to 3, and a recording layer cable of recording and reproducing information using laser beams provided on the other surface of said disk; and connecting means for connecting said first disk and said second disk in spaced, coaxial relationship such that the recording layers of said first disk and said second disk are contained in a central air cavity formed by said first disk, said second disk and said connecting means.

19. A laser recording disk comprising a first disk-shaped base, having a polysiloxane coating film provided on one surface of said said base, said coating film being produced from a monomer represented by the formula $R_xSi(OR')_{4-x'}$ wherein R and $R^1$ each represents an alkyl group having from 1 to 3 carbons or a phenyl group, and x represents 0 or an integer of from 1 to 3, and a recording layer capable of recording and reproducing information using laser beams provided on the other surface of said disk;

a second disk-shaped base having a polysiloxane coating film provided on one surface of said base, said coating film being produced from a monomer represented by the formula $R_xSi(OR')_{4-x'}$, wherein R and $R^1$ each represents an alkyl group having from 1 to 3 carbons or a phenyl group, and x represents 0 or an integer of from 1 to 3, and a recording layer capable of recording and reproducing information using laser beams provided on the other surface of said disk; and a third disk-shaped base interposed between said first and second disk-shaped bases in coaxial relationship therewith, each of the opposite surfaces of said third disk-shaped base being respectively attached to a surface of said first or second disk-shaped base on which said recording layer has been provided, whereby the recording layers of said first and second disk-shaped bases face each other.

* * * * *